United States Patent [19]

Lundin

[11] 4,208,804

[45] Jun. 24, 1980

[54] RULER MEANS FOR DIVIDING A DISTANCE

[76] Inventor: Birgitta M. Lundin, Sampovägen 2, 10900 Hangö90, Finland

[21] Appl. No.: 948,206

[22] Filed: Oct. 3, 1978

[30] Foreign Application Priority Data

Oct. 5, 1977 [FI] Finland ................... 772940

[51] Int. Cl.² ............................... B43L 7/06
[52] U.S. Cl. .................... 33/418; 33/424; 33/487
[58] Field of Search ............... 33/93, 107, 110, 111, 33/192, 1 F, 418, 420, 424, 487

[56] References Cited

U.S. PATENT DOCUMENTS

| 971,529 | 10/1910 | Dickson | 33/93 |
|---|---|---|---|
| 1,290,977 | 1/1919 | Greene | 33/93 |
| 1,451,572 | 4/1923 | Green | 33/93 |
| 2,342,476 | 2/1944 | McEvoy et al. | 33/107 R |
| 3,020,642 | 2/1962 | Rickey | 33/93 |
| 3,416,232 | 12/1968 | Overbay | 33/424 |

FOREIGN PATENT DOCUMENTS

1062299   4/1954   France ................... 33/111

OTHER PUBLICATIONS

Gresecke, Mitchell, Spencer "Technical Drawing," MacMillan Co., 1949, p. 71.

Primary Examiner—John W. Shepperd
Attorney, Agent, or Firm—J. Harold Nissen

[57] ABSTRACT

A ruler means for dividing a distance into an optional number of parts, e.g., into equal parts. The ruler means comprises a ruler with a number of numbered scales with a zero point. Said ruler is, along said scales, provided with holes for plotting an optional division of an auxiliary distance such the the projection thereof comprises the actual distance to be divided. The holes are equidistantly spaced and tapered toward the rear face of said ruler.

5 Claims, 2 Drawing Figures

RULER MEANS FOR DIVIDING A DISTANCE

The present invention relates to a ruler means for dividing a distance into an optional number of parts, e.g., into equal parts, comprising a ruler with at least one numbered first scale with a zero point.

In a drawing office, it is a daily occurrence to divide a distance into equal parts, for example, when drawing a staircase where the height and length of the stairs must be determined. In practice, this is a difficult and time-consuming step. The distance must be measured, divided, and marked out. The marking out is most often done at the edge of the ruler, and it goes without saying that the precision is not the best possible in this instance.

In practice, the distance is measured, e.g., with a millimeter ruler whereafter it is divided, in more difficult cases, by means of a calculator, in easier cases, by mental calculation. Thereafter the part distances so obtained are plotted by means of the ruler.

It is the object of the present invention to eliminate the above mentioned disadvantages and to provide a very simple means for dividing an optional distance into, in principle, any number of optional parts and to set the length of the parts with a precision which is satisfactory within the drawing technology.

The ruler means according to the invention is mainly characterized in that the ruler, along said first scale or scales, is provided with holes or notches for plotting an optional division of an auxiliary distance the projection whereof comprises the distance to be divided.

The invention has, a.o., the following advantages:

The distance need not be divided by means of a calculator or mental calculation.

The distance need not be measured.

The part distances are plotted through small conical holes in the ruler, which ensures a high precision.

The ruler according to the invention will now be described in more detail with reference to the embodiments illustrated in the accompanying drawing.

Figure 1:
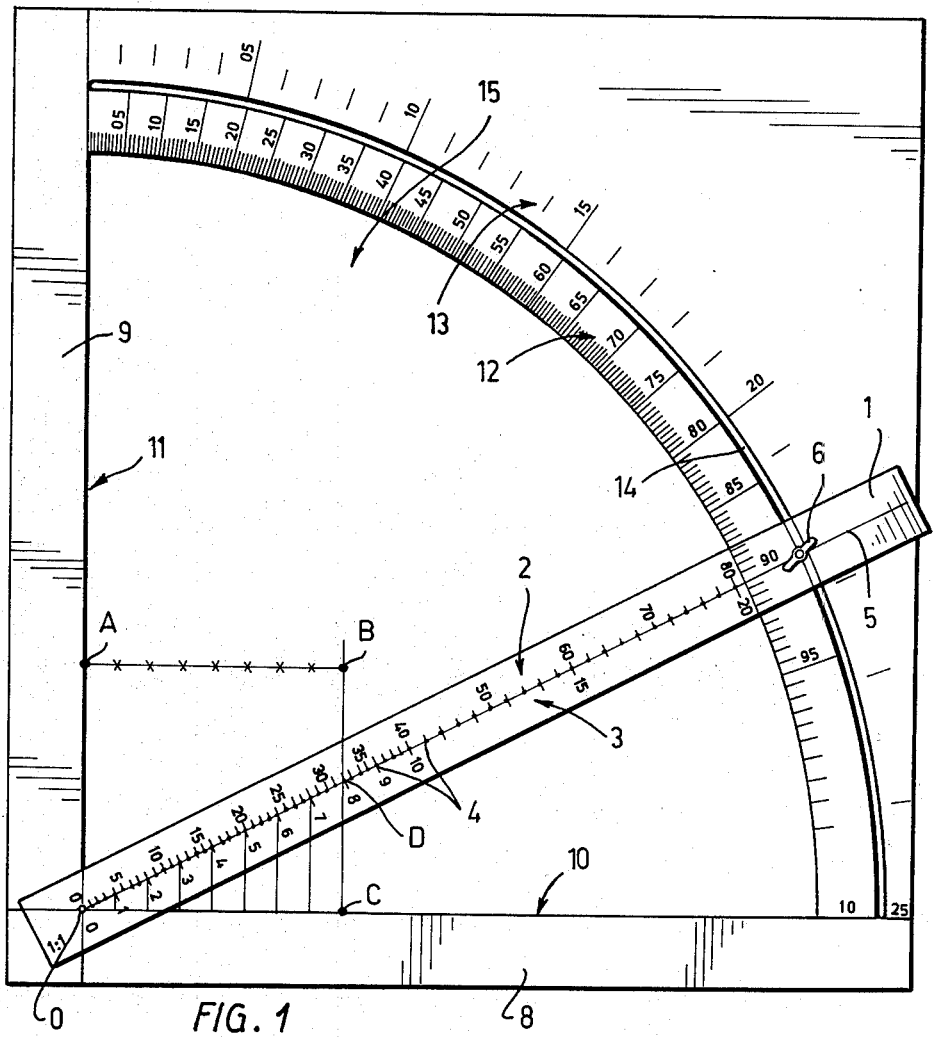
FIG. 1 illustrates a ruler construction according to the invention, including scales showing the length of the parts of a divided distance.

In the following embodiment referring to FIG. 1, attention will at first be paid to the ruler 1 made of transparent material. This ruler has a zero point 0, and a scale 2 numbered from 0 to 80, and a scale 3 numbered from 0 to 20. Assume that the horizontal distance A-B must be divided into eight equal parts. For this purpose, the orthogonal projection 0-C of the distance A-B is selected, and the zero point of the ruler 1 is placed so that it coincided with the point 0 on the distance 0-C. The ruler 1 is thereafter turned so that the point 8 on the scale 3 coincides with the vertical line B-C in a point D. The distance 0-D is now divided by plotting through the holes 4 belonging to the points 1, 2, 3, 4, 5, 6, and 7 into eight equal parts. Thereafter, only the projections of these points need by transferred, e.g., by means of a drawing table ruler to the distance A-B, said distance also thereby being divided into eight equal parts.

As stated above, the different points on the scales are provided with holes 4 which taper toward the rear face of the ruler 1 and are preferable conical in shape to allow a precise plotting.

Instead of holes penetrating the ruler, also wedge-shaped notches at the edge of the ruler may be contemplated. The holes 4 or the notches are preferably equidistantly spaced as an equal division of a distance is the most common application. In principle, also an optional, e.g., an unequal division of a distance may be carried out. according to the invention.

Figure 2:
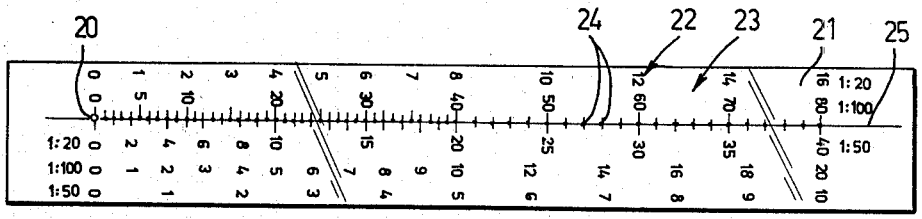
FIG. 2 illustrates a separate dividing ruler according to the invention.

The ruler 21 according to FIG. 2 is provided with five different scales, 22, 23 allowing a distance to be divided practically in any manner occurring in practice.

An advanced form of the ruler means according to the invention appears from FIG. 1 as seen as a whole. The means comprises a transparent plate 7-9 provided with an opening 15 having two orthogonal sides 10, 11 and with two numbered scales 12, 13 extending over a quarter of a circle. The ruler 1 can be turned along said scales 12, 13, whereby the ruler 1 is at its zero point 0 pivotally journalled in a point on the plate 7-9 corresponding to the centre of the above mentioned circle and at the point where the two orthogonal sides 10, 11 intersect. The scales 12, 13 are graduated to indicate the length of the parts in the divided distance A-B. In the example case, the distance 9.0 mm can be read on the scale 12. The ruler 1 can by means of the clamping screw 6 be locked in the desired position in the arc-shaped score 14 in the plate 7-9.

The basic idea, accordingly, is to divide by means of the dividing ruler 1 a distance into an optional number of equal parts and to read the length of the parts on the scale 12, 13. The dividing ruler may, of course, also be used in the opposite order, namely so that the length of the parts is set on the scale 12, 13 and the number of the parts is read on the ruler 1.

What is claim is:

1. A ruler means for dividing a distance into an optional number of parts, e.g., into equal parts, comprising:
   a ruler having at least one numbered first scale and a zero point, wherein said ruler, along said first scale or scales, is provided with plotting means, such as holes, for plotting an optional division of an auxiliary distance the projection whereof comprises the distance to be divided, said holes being equidistantly spaced and being tapered toward the rear face of said ruler, and the number of said first scales being 1 to 6;
   a partially open plate having at least one numbered second scale extending over an arc of a circle, e.g., a quarter of a circle, and a center point, said second scale being graduated to indicate the length of the parts in the divided line, and
   means for journalling the ruler at its zero point in said center point of said plate.

2. The ruler means as claimed in claim 1, wherein said partially open plate is provided with an arc-shaped score, and locking means cooperating with said ruler and said arc-shaped score for locking said ruler and said partially open plate together.

3. The ruler means as claimed in claim 2, wherein said partially open plate is provided with at least one of said second scales on either side of said arc-shaped score.

4. The ruler means as claimed in claim 1, 2 or 3, wherein said center point and said zero point coincide.

5. The ruler as claimed in claim 1, 2 or 3, wherein said open plate includes two orthogonal sides which intersect at said center point, said journalling means interconnecting said zero point of said ruler with the intersection point of said orthogonal sides.

* * * * *